(12) United States Patent
Li et al.

(10) Patent No.: US 10,736,038 B2
(45) Date of Patent: Aug. 4, 2020

(54) CHANNEL MONITORING METHOD AND DEVICE

(71) Applicant: Huawei Technologies Co., Ltd., Shenzhen (CN)

(72) Inventors: Bingzhao Li, Beijing (CN); Wei Quan, Beijing (CN); Xiaodong Yang, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 15/221,126

(22) Filed: Jul. 27, 2016

(65) Prior Publication Data
US 2016/0337975 A1 Nov. 17, 2016

Related U.S. Application Data

(63) Continuation of application No. PCT/CN2014/071697, filed on Jan. 28, 2014.

(51) Int. Cl.
*H04W 4/14* (2009.01)
*H04W 52/02* (2009.01)
(Continued)

(52) U.S. Cl.
CPC ....... *H04W 52/0238* (2013.01); *H04W 16/14* (2013.01); *H04W 52/0216* (2013.01);
(Continued)

(58) Field of Classification Search
CPC .......................... H04W 52/0238; H04W 16/14
See application file for complete search history.

(56) References Cited

U.S. PATENT DOCUMENTS

2011/0002281 A1\* 1/2011 Terry ................ H04W 52/0216
370/329
2011/0134774 A1\* 6/2011 Pelletier .............. H04W 52/365
370/252
(Continued)

FOREIGN PATENT DOCUMENTS

CN 103503534 A 1/2014
WO WO 2012118740 A1 9/2012
(Continued)

*Primary Examiner* — Zhiren Qin
(74) *Attorney, Agent, or Firm* — Leydig, Voit & Mayer, Ltd.

(57) ABSTRACT

The present invention provides a channel monitoring method and device. The method includes: receiving, by user equipment (UE), a first notification message sent by a base station, where the first notification message includes usage information of a frequency resource of a second carrier; determining, by the UE according to the first notification message, whether the frequency resource of the second carrier is in an available state; and if the UE determines that the frequency resource of the second carrier is in the available state, monitoring a PDCCH corresponding to the second carrier; otherwise, stopping monitoring a PDCCH corresponding to the second carrier, where the second carrier is a carrier on which the UE operates on a discontinuously occupied frequency resource. According to the foregoing method, the UE can properly use an unlicensed frequency to communicate with the base station, and meanwhile reduce power consumption of the UE.

15 Claims, 5 Drawing Sheets

---

UE configures at least one logical channel used to carry data — 601

If data carried by the at least one logical channel is not transmitted by using the second carrier within a preset first period of time, the UE stops monitoring a PDCCH corresponding to the second carrier, where a priority of choosing the second carrier to transmit the data carried by the at least one logical channel is higher than a priority of choosing a first carrier to transmit the data carried by the at least one logical channel — 602

(51) Int. Cl.
*H04W 16/14* (2009.01)
*H04W 72/04* (2009.01)

(52) U.S. Cl.
CPC ..... *H04W 72/042* (2013.01); *H04W 72/0453* (2013.01); *Y02D 70/1242* (2018.01); *Y02D 70/1262* (2018.01); *Y02D 70/24* (2018.01)

(56) References Cited

U.S. PATENT DOCUMENTS

| | | | | |
|---|---|---|---|---|
| 2013/0163497 | A1* | 6/2013 | Wei | H04L 5/0007 370/311 |
| 2013/0329692 | A1 | 12/2013 | Vrzic et al. | |
| 2014/0029459 | A1* | 1/2014 | Kwon | H04W 76/28 370/252 |
| 2015/0085712 | A1* | 3/2015 | Wang | H04L 1/1848 370/280 |
| 2015/0189627 | A1* | 7/2015 | Yang | H04L 5/14 370/280 |
| 2017/0155487 | A1* | 6/2017 | Pelletier | H04L 5/0023 |
| 2018/0175975 | A1* | 6/2018 | Um | H04L 1/1816 |

FOREIGN PATENT DOCUMENTS

| | | |
|---|---|---|
| WO | WO 2013116321 A1 | 8/2013 |
| WO | WO 2013116998 A1 | 8/2013 |

\* cited by examiner

CHANNEL MONITORING METHOD AND DEVICE

CROSS-REFERENCE TO RELATED APPLICATIONS

This application is a continuation of International Patent Application No. PCT/CN2014/071697, filed Jan. 28, 2014, which is hereby incorporated by reference in its entirety.

TECHNICAL FIELD

The present invention relates to communications technologies, and in particular, to a channel monitoring method and device.

BACKGROUND

In current spectrum management, some spectrums are granted to a specific mobile operator or a specific mobile technology (such as Universal Mobile Telecommunications System (UMTS for short) or Long Term Evolution (LTE for short)), and the spectrums are referred to as licensed spectrums (licensed spectrum). Some spectrums are also allocated to unlicensed user equipment (UE for short) for use, and different wireless devices can share frequency resources on the spectrums. The spectrums are referred to as unlicensed spectrums.

The unlicensed spectrums refer to spectrums that can be used by any organization or personal device. However, when the unlicensed spectrums are being used, a specific rule needs to be followed, that is, monitoring is performed before sending. A signal can be sent on an unlicensed spectrum provided that an idle spectrum is detected by any device. If an LTE network is deployed on the unlicensed spectrum, a carrier corresponding to the unlicensed spectrum of the UE may be dynamic. That is, the UE cannot continuously occupy a resource of the unlicensed spectrum.

When a secondary carrier of UE uses an unlicensed spectrum, because the secondary carrier needs to acquire a resource of the unlicensed spectrum based on contention, the UE needs to always monitor the unlicensed spectrum, which leads to extremely large power consumption of the UE. Therefore, how to reduce power consumption of the UE when the secondary carrier of the UE uses an unlicensed frequency becomes a technical problem that needs to be resolved currently.

SUMMARY

The present invention provides a channel monitoring method and device, so as to implement that UE properly uses an unlicensed spectrum frequency to communicate with a base station, and can reduce power consumption of the UE.

According to a first aspect, an embodiment of the present invention provides a channel monitoring method, including:

receiving, by user equipment UE, a first notification message sent by a base station, where the first notification message includes usage information of a frequency resource of a second carrier;

determining, by the UE according to the first notification message, whether the frequency resource of the second carrier is in an available state; and if the UE determines that the frequency resource of the second carrier is in the available state, monitoring a physical downlink control channel PDCCH corresponding to the second carrier; or if the UE determines that the frequency resource of the second carrier is in an unavailable state, stopping monitoring a PDCCH corresponding to the second carrier, where the second carrier is a carrier on which the UE operates on a discontinuously occupied frequency resource.

With reference to the first aspect, in a first possible implementation manner, the receiving, by UE, a first notification message sent by a base station includes:

receiving, by the UE, the first notification message that is sent by the base station by using the second carrier; or receiving, by the UE, the first notification message that is sent by the base station by using a first carrier, where the first carrier is a carrier on which the UE operates on a continuously occupied frequency resource.

With reference to the first aspect or the first possible implementation manner of the first aspect, in a second possible implementation manner, the usage information of the frequency resource of the second carrier includes one or more of the following information:

information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

With reference to the first aspect and the second possible implementation manner of the first aspect, in a third possible implementation manner, the usage information of the frequency resource of the second carrier includes the information about the duration in which the frequency resource of the second carrier is unavailable; and the determining, according to the first notification message, whether the frequency resource of the second carrier is in an available state includes:

determining, according to the first notification message, that the frequency resource of the second carrier is in the unavailable state, determining the duration of the unavailable state of the frequency resource of the second carrier, and after the duration of the unavailable state ends, determining that the frequency resource of the second carrier is in the available state.

With reference to the first aspect and the second possible implementation manner of the first aspect, in a fourth possible implementation manner, the usage information of the frequency resource of the second carrier includes the information about the duration in which the frequency resource of the second carrier is available; and the determining, according to the first notification message, whether the frequency resource of the second carrier is in an available state includes:

determining, according to the first notification message, that the frequency resource of the second carrier is in the available state, determining the duration of the available state of the frequency resource of the second carrier, and after the duration of the available state ends, determining that the frequency resource of the second carrier is in the unavailable state.

With reference to the first aspect and the second possible implementation manner of the first aspect, in a fifth possible implementation manner, the information about the availability of the frequency resource of the second carrier includes:

scheduling indication information used by the base station to schedule the UE to perform data transmission on the second carrier.

With reference to the first aspect and the second possible implementation manner of the first aspect, in a sixth possible implementation manner, the usage information of the frequency resource of the second carrier includes the information about release of the frequency resource of the second carrier;

the determining, by the UE according to the first notification message, whether the frequency resource of the second carrier is in an available state includes:

determining, by the UE according to the first notification message, that the frequency resource of the second carrier is in the unavailable state; and the method further includes:

releasing, by the UE, an occupied frequency resource of the second carrier according to the first notification message.

According to a second aspect, an embodiment of the present invention provides a channel monitoring method, including:

receiving, by user equipment UE, a configuration message sent by a base station, where the configuration message includes configuration information of discontinuous reception DRX; and entering a state of a first DRX cycle when a physical downlink control channel PDCCH corresponding to a first carrier is not received within a preset first period of time after the UE performs configuration according to the configuration information, and stopping monitoring a PDCCH corresponding to a second carrier after the UE enters the state of the first DRX cycle, where the second carrier is a carrier on which the UE operates on a discontinuously occupied frequency resource, and the first carrier is a carrier on which the UE operates on a continuously occupied frequency resource.

With reference to the second aspect, in a first possible implementation manner, the entering a state of a first DRX cycle when a physical downlink control channel PDCCH corresponding to a first carrier is not received within a preset first period of time after the UE performs configuration according to the configuration information, and stopping monitoring a PDCCH corresponding to a second carrier after the UE enters the state of the first DRX cycle includes:

after entering the state of the first DRX cycle when the PDCCH corresponding to the first carrier is not received within the preset first period of time after the UE performs the configuration according to the configuration information, if the PDCCH is not received continuously within a preset second period of time in duration of the first DRX cycle, entering a state of a second DRX cycle; and stopping monitoring the PDCCH corresponding to the second carrier after the UE enters the state of the second DRX cycle.

With reference to the second aspect, in a second possible implementation manner, the method further includes:

after the UE exits the state of the first DRX cycle, starting to monitor the PDCCH corresponding to the second carrier.

With reference to the second aspect and the first possible implementation manner of the second aspect, in a third possible implementation manner, the method further includes:

after the UE exits the state of the second DRX cycle, starting to monitor the PDCCH corresponding to the second carrier.

According to a third aspect, an embodiment of the present invention provides a channel monitoring method, including:

configuring, by user equipment UE, at least one logical channel used to carry data; and if the data carried by the at least one logical channel is not transmitted by using the second carrier within a preset first period time, stopping, by the UE, monitoring a physical downlink control channel PDCCH corresponding to the second carrier, where a priority of choosing the second carrier to transmit the data carried by the at least one logical channel is higher than a priority of choosing a first carrier to transmit the data carried by the at least one logical channel, and the second carrier is a carrier on which the UE operates on a discontinuously occupied frequency resource.

With reference to the third aspect, in a first possible implementation manner, the method further includes:

when no data is transmitted on the second carrier within a preset second period of time, stopping monitoring the PDCCH corresponding to the second carrier.

According to a fourth aspect, an embodiment of the present invention provides user equipment, including:

a receiving unit, configured to receive a first notification message sent by a base station, where the first notification message includes usage information of a frequency resource of a second carrier;

a determining unit, configured to determine, according to the first notification message received by the receiving unit, whether the frequency resource of the second carrier is in an available state; and a monitoring unit, configured to: when the determining unit determines that the frequency resource of the second carrier is in the available state, monitor a physical downlink control channel PDCCH corresponding to the second carrier; otherwise, stop monitoring a PDCCH corresponding to the second carrier, where the second carrier is a carrier on which the user equipment UE operates on a discontinuously occupied frequency resource.

With reference to the fourth aspect, in a first possible implementation manner, the receiving unit is specifically configured to:

receive the first notification message that is sent by the base station by using the second carrier; or receive the first notification message that is sent by the base station by using a first carrier, where the first carrier is a carrier on which the UE operates on a continuously occupied frequency resource.

With reference to the fourth aspect or the first possible implementation manner of the fourth aspect, in a second possible implementation manner, the usage information of the frequency resource of the second carrier includes one or more of the following information:

information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

With reference to the fourth aspect and the second possible implementation manner of the fourth aspect, in a third possible implementation manner, if the usage information of the frequency resource of the second carrier includes the information about the duration in which the frequency resource of the second carrier is unavailable, the determining unit is specifically configured to:

determine, according to the first notification message received by the receiving unit, that the frequency resource of the second carrier is in the unavailable state, determine the duration of the unavailable state of the frequency resource of the second carrier, and after the duration of the unavailable state ends, determine that the frequency resource of the second carrier is in the available state.

With reference to the fourth aspect and the second possible implementation manner of the fourth aspect, in a fourth possible implementation manner, if the usage information of the frequency resource of the second carrier includes the information about the duration in which the frequency resource of the second carrier is available, the determining unit is specifically configured to:

determine, according to the first notification message received by the receiving unit, that the frequency resource of the second carrier is in the available state, determine the duration of the available state of the frequency resource of the second carrier, and after the duration of the available state ends, determine that the frequency resource of the second carrier is in the unavailable state.

With reference to the fourth aspect and the second possible implementation manner of the fourth aspect, in a fifth possible implementation manner, the information about the availability of the frequency resource of the second carrier includes:

scheduling indication information used by the base station to schedule the UE to perform data transmission on the second carrier.

With reference to the fourth aspect and the second possible implementation manner of the fourth aspect, in a sixth possible implementation manner, if the usage information of the frequency resource of the second carrier includes the information about release of the frequency resource of the second carrier, the determining unit is specifically configured to:

determine, according to the first notification message received by the receiving unit, that the frequency resource of the second carrier is in the unavailable state; and the user equipment further includes: a releasing unit, where the releasing unit is configured to release an occupied frequency resource of the second carrier according to the first notification message received by the receiving unit.

According to a fifth aspect, an embodiment of the present invention provides user equipment, including:

a receiving unit, configured to receive a configuration message sent by a base station, where the configuration message includes configuration information of discontinuous reception DRX;

a configuration unit, configured to perform configuration according to the configuration message received by the receiving unit; and a monitoring unit, configured to: enter a state of a first DRX cycle when a physical downlink control channel PDCCH corresponding to a first carrier is not received within a preset first period of time after the configuration unit performs the configuration, and stop monitoring a PDCCH corresponding to a second carrier after the UE enters the state of the first DRX cycle, where the second carrier is a carrier on which the user equipment UE operates on a discontinuously occupied frequency resource, and the first carrier is a carrier on which the UE operates on a continuously occupied frequency resource.

With reference to the fifth aspect, in a first possible implementation manner, the monitoring unit is further configured to:

after entering the state of the first DRX cycle when the PDCCH corresponding to the first carrier is not received within the preset first period of time after the configuration unit performs the configuration, if the PDCCH is not received continuously within a preset second period of time in duration of the first DRX cycle, enter a state of a second DRX cycle; and stop monitoring the PDCCH corresponding to the second carrier after the UE enters the state of the second DRX cycle.

With reference to the fifth aspect, in a second possible implementation manner, the monitoring unit is further configured to:

after the UE exits the state of the first DRX cycle, start to monitor the PDCCH corresponding to the second carrier.

With reference to the fifth aspect and the first possible implementation manner of the fifth aspect, in a third possible implementation manner, the monitoring unit is further configured to:

after the UE exits the state of the second DRX cycle, start to monitor the PDCCH corresponding to the second carrier.

According to a sixth aspect, an embodiment of the present invention provides user equipment, including:

a configuration unit, configured to configure at least one logical channel that carries data; and a monitoring unit, configured to: when the data carried by the at least one logical channel is not transmitted by using the second carrier within a preset first period time, stop monitoring a physical downlink control channel PDCCH corresponding to the second carrier, where a priority of choosing the second carrier to transmit the data carried by the at least one logical channel is higher than a priority of choosing a first carrier to transmit the data carried by the at least one logical channel, and the second carrier is a carrier on which the UE operates on a discontinuously occupied frequency resource.

With reference to the sixth aspect, in a first possible implementation manner, the monitoring unit is further configured to:

when no data is transmitted on the second carrier within a preset second period of time, stop monitoring the PDCCH corresponding to the second carrier.

According to a seventh aspect, an embodiment of the present invention provides user equipment, including:

a memory and a processor, where the memory is configured to store an instruction and the processor is configured to execute the instruction stored in the memory so as to:

receive a first notification message sent by a base station, where the first notification message includes usage information of a frequency resource of a second carrier;

determine, according to the first notification message, whether the frequency resource of the second carrier is in an available state; and if it is determined that the frequency resource of the second carrier is in the available state, monitor a physical downlink control channel PDCCH corresponding to the second carrier; or if it is determined that the frequency resource of the second carrier is in an unavailable state, stop monitoring a PDCCH corresponding to the second carrier, where the second carrier is a carrier on which the user equipment UE operates on a discontinuously occupied frequency resource.

With reference to the seventh aspect, in a first possible implementation manner, the processor is specifically configured to:

receive the first notification message that is sent by the base station by using the second carrier; or receive the first notification message that is sent by the base station by using a first carrier, where the first carrier is a carrier on which the UE operates on a continuously occupied frequency resource.

With reference to the seventh aspect or the first possible implementation manner of the seventh aspect, in a second possible implementation manner, the usage information of the frequency resource of the second carrier includes one or more of the following information:

information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

With reference to the seventh aspect and the second possible implementation manner of the seventh aspect, in a third possible implementation manner, when the usage information of the frequency resource of the second carrier includes the information about the duration in which the frequency resource of the second carrier is unavailable, the processor is specifically configured to:

determine, according to the first notification message, that the frequency resource of the second carrier is in the unavailable state, determine the duration of the unavailable state of the frequency resource of the second carrier, and after the duration of the unavailable state ends, determine that the frequency resource of the second carrier is in the available state.

With reference to the seventh aspect and the second possible implementation manner of the seventh aspect, in a fourth possible implementation manner, when the usage information of the frequency resource of the second carrier includes the information about the duration in which the frequency resource of the second carrier is available, the processor is specifically configured to:

determine, according to the first notification message, that the frequency resource of the second carrier is in the available state, determine the duration of the available state of the frequency resource of the second carrier, and after the duration of the available state ends, determine that the frequency resource of the second carrier is in the unavailable state.

With reference to the seventh aspect and the second possible implementation manner of the seventh aspect, in a fifth possible implementation manner, the information about the availability of the frequency resource of the second carrier includes:

scheduling indication information used by the base station to schedule the UE to perform data transmission on the second carrier.

With reference to the seventh aspect and the second possible implementation manner of the seventh aspect, in a sixth possible implementation manner, when the usage information of the frequency resource of the second carrier includes the information about release of the frequency resource of the second carrier, the processor is specifically configured to:

determine, according to the first notification message, that the frequency resource of the second carrier is in the unavailable state; and the processor is further configured to:

release an occupied frequency resource of the second carrier according to the first notification message.

According to an eighth aspect, an embodiment of the present invention provides user equipment, including:

a memory and a processor, where the memory is configured to store an instruction and the processor is configured to execute the instruction stored in the memory so as to:

receive a configuration message sent by a base station, where the configuration message includes configuration information of discontinuous reception DRX; and enter a state of a first DRX cycle when a physical downlink control channel PDCCH corresponding to a first carrier is not received within a preset first period of time after performing configuration according to the configuration information, and stop monitoring a PDCCH corresponding to a second carrier after the UE enters the state of the first DRX cycle, where the second carrier is a carrier on which the user equipment UE operates on a discontinuously occupied frequency resource.

With reference to the eighth aspect, in a first possible implementation manner, the processor is further configured to:

after entering the state of the first DRX cycle when the PDCCH corresponding to the first carrier is not received within the preset first period of time after performing the configuration according to the configuration information, if the PDCCH is not received continuously within a preset second period of time in duration of the first DRX cycle, enter a state of a second DRX cycle; and stop monitoring the PDCCH corresponding to the second carrier after the UE enters the state of the second DRX cycle.

With reference to the eighth aspect, in a second possible implementation manner, the processor is further configured to:

after the UE exits the state of the first DRX cycle, start to monitor the PDCCH corresponding to the second carrier.

With reference to the eighth aspect and the first possible implementation manner of the eighth aspect, in a third possible implementation manner, the processor is further configured to:

after the UE exits the state of the second DRX cycle, start to monitor the PDCCH corresponding to the second carrier.

According to a ninth aspect, an embodiment of the present invention provides user equipment, including:

a memory and a processor, where the memory is configured to store an instruction and the processor is configured to execute the instruction stored in the memory so as to:

configure at least one logical channel used to carry data; and if the data carried by the at least one logical channel is not transmitted by using the second carrier within a preset first period time, stop monitoring a physical downlink control channel PDCCH corresponding to the second carrier, where a priority of choosing the second carrier to transmit the data carried by the at least one logical channel is higher than a priority of choosing a first carrier to transmit the data carried by the at least one logical channel, and the second carrier is a carrier on which the user equipment UE operates on a discontinuously occupied frequency resource.

With reference to the ninth aspect, in a first possible implementation manner, the processor is further configured to:

when no data is transmitted on the second carrier within a preset second period of time, stop monitoring the PDCCH corresponding to the second carrier.

It may be learned from the foregoing technical solutions that, according to the channel monitoring method and device in the embodiments of the present invention, UE receives a first notification message that is sent by a base station and includes usage information of a frequency resource of a second carrier, determines, according to the first notification message, whether the frequency resource of the second carrier is in an available state, further determines whether a PDCCH of the second carrier needs to be monitored, and therefore can stop monitoring the PDCCH of the second carrier when the frequency resource of the second carrier is unavailable, which reduces power consumption of the UE, so that the UE can properly use an unlicensed frequency to communicate with the base station.

DESCRIPTION OF EMBODIMENTS

A discontinuous reception (DRX for short) state indicates that, in a DRX cycle, user equipment (UE for short) receives a physical downlink control channel (PDCCH for short) only within a period of time, that is, DRX ON, and does not need to receive a PDCCH within a remaining time, that is, DRX OFF. Therefore, a network side device can schedule the UE only within a DRX ON period.

In a Long Term Evolution (LTE for short) technology, to reduce power consumption of UE, the UE may be in a DRX cycle state after there is no data.

Figure 1:
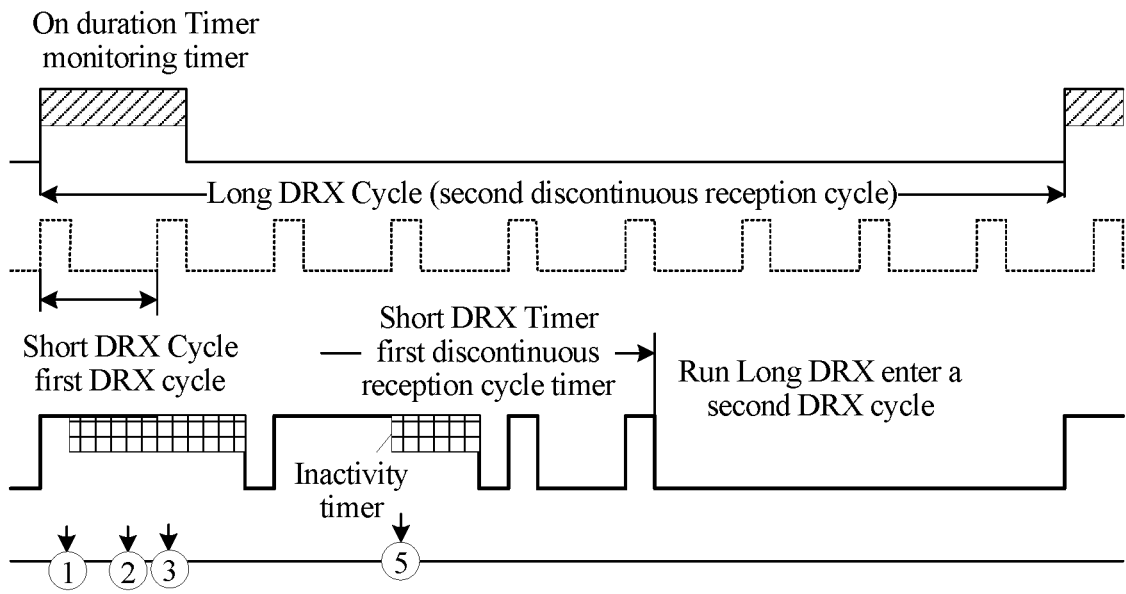
FIG. 1 is a schematic diagram of a current DRX cycle.

As shown in FIG. 1, current DRX is classified into two levels, where a first level is short-cycle DRX, and a second level is long-cycle DRX. UE enters a state of a short DRX cycle if no data arrives within a period of time after data transfer ends. The UE enters a state of long-cycle DRX if there is still no data after the UE stays in the short cycle for a period of time. A period of the long-cycle DRX is longer than the short cycle, and a power-saving effect of the long-cycle DRX cycle is better than that of the short cycle. However, after data of the UE arrives, a scheduling delay of the long-cycle DRX is longer than that of the short cycle.

Multi-carrier DRX can be understood as follows: After a multi-carrier technology is introduced, UE can receive and send data on multiple carriers at the same time.

Embodiments of the present invention provide the following channel monitoring method, so that UE that operates on multiple carriers properly uses an unlicensed frequency for communication in a case in which power consumption is reduced.

Figure 2:
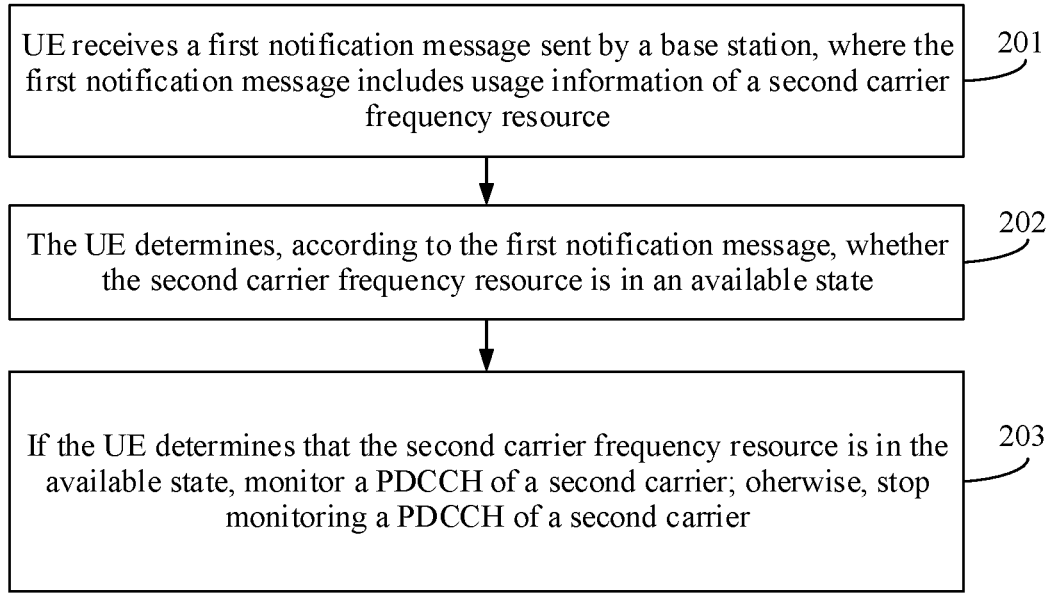
FIG. 2 is a schematic flowchart of a channel monitoring method according to a first embodiment of the present invention.

FIG. 2 is a schematic flowchart of a channel monitoring method according to a first embodiment of the present invention. As shown in FIG. 2, the channel monitoring method in this embodiment includes:

201. UE receives a first notification message sent by a base station, where the first notification message includes usage information of a frequency resource of a second carrier.

For example, the UE may receive the first notification message that is sent by the base station by using the second carrier; or the UE may receive the first notification message that is sent by the base station by using a first carrier.

The second carrier in this embodiment may be a carrier on which the UE operates on a discontinuously occupied frequency resource, and the first carrier may be a carrier on which the UE operates on a continuously occupied frequency resource.

In this embodiment, if the second carrier is unavailable, the UE may receive the first notification message that is sent by the base station by using the first carrier. If the second carrier is available, the UE may receive the first notification message that is sent by the base station by using the first carrier or the second carrier.

It should be noted that a specific configuration process of the first carrier and the second carrier in this embodiment includes: receiving, by the UE, carrier configuration information sent by the base station; and configuring, by the UE according to the carrier configuration information, an operating carrier on the continuously occupied frequency resource as the first carrier, and configuring an operating carrier on the discontinuously occupied frequency resource as the second carrier. For example, the first carrier may be a carrier, configured by the base station, on which the UE operates on a licensed frequency, and the second carrier may be a carrier, configured by the base station, on which the UE operates on an unlicensed frequency.

Alternatively, in a possible implementation manner, the foregoing second carrier may be a carrier, configured by the base station, on which the UE operates on a licensed frequency. Certainly, a frequency resource corresponding to the second carrier may be discontinuously occupied in terms of time.

For example, the usage information of the frequency resource of the second carrier includes one or more of the following information: information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

In this embodiment, the information about the availability of the frequency resource of the second carrier may include scheduling indication information used by the base station to schedule the UE to perform data transmission on the second carrier or other information sent by the base station. This embodiment is merely used as an example for description, and is not limited.

202. The UE determines, according to the first notification message, whether the frequency resource of the second carrier is in an available state.

203. If the UE determines that the frequency resource of the second carrier is in the available state, monitor a PDCCH of the second carrier; otherwise, stop monitoring a PDCCH of the second carrier.

Optionally, if the usage information of the frequency resource of the second carrier in the foregoing step 201 includes the information about the duration in which the frequency resource of the second carrier is unavailable.

In this case, step 202 may include the following step 202a that is not shown in the figure:

202a. Determine, according to the first notification message, that the frequency resource of the second carrier is in the unavailable state, determine duration of the unavailable state of the frequency resource of the second carrier, and after the duration of the unavailable state ends, determine that the frequency resource of the second carrier is in the available state.

That is, after the base station determines that another device occupies the foregoing unlicensed frequency, the base station may send the first notification message to the UE by using the first carrier, so that the UE may determine the duration of the unavailable state of the frequency resource of the second carrier according to the first notification message. Further, when the frequency resource of the second carrier is unavailable, the UE may not monitor the PDCCH of the second carrier, so that power consumption of the UE can be reduced.

Optionally, if the usage information of the frequency resource of the second carrier in the foregoing step 201 includes the information about release of the frequency resource of the second carrier.

In this case, step 202 may include the following step 202b that is not shown in the figure:

202b. The UE determines, according to the first notification message, that the frequency resource of the second carrier is in an unavailable state.

Optionally, if the usage information of the frequency resource of the second carrier in the foregoing step 201 includes the information about the duration in which the frequency resource of the second carrier is available.

In this case, step 202 may include the following step 202c that is not shown in the figure:

202c. Determine, according to the first notification message, that the frequency resource of the second carrier is in the available state, determine duration of the available state of the frequency resource of the second carrier, and after the duration of the available state ends, determine that the frequency resource of the second carrier is in the unavailable state.

According to the channel monitoring method in this embodiment, UE receives a first notification message that is sent by a base station and includes usage information of a frequency resource of a second carrier, determines, according to the first notification message, whether the frequency resource of the second carrier is in an available state, further determines whether a PDCCH of the second carrier needs to be monitored, and therefore can stop monitoring the PDCCH of the second carrier when the frequency resource of the second carrier is unavailable, which reduces power consumption of the UE, so that the UE can properly use an unlicensed frequency to communicate with the base station.

Figure 3:
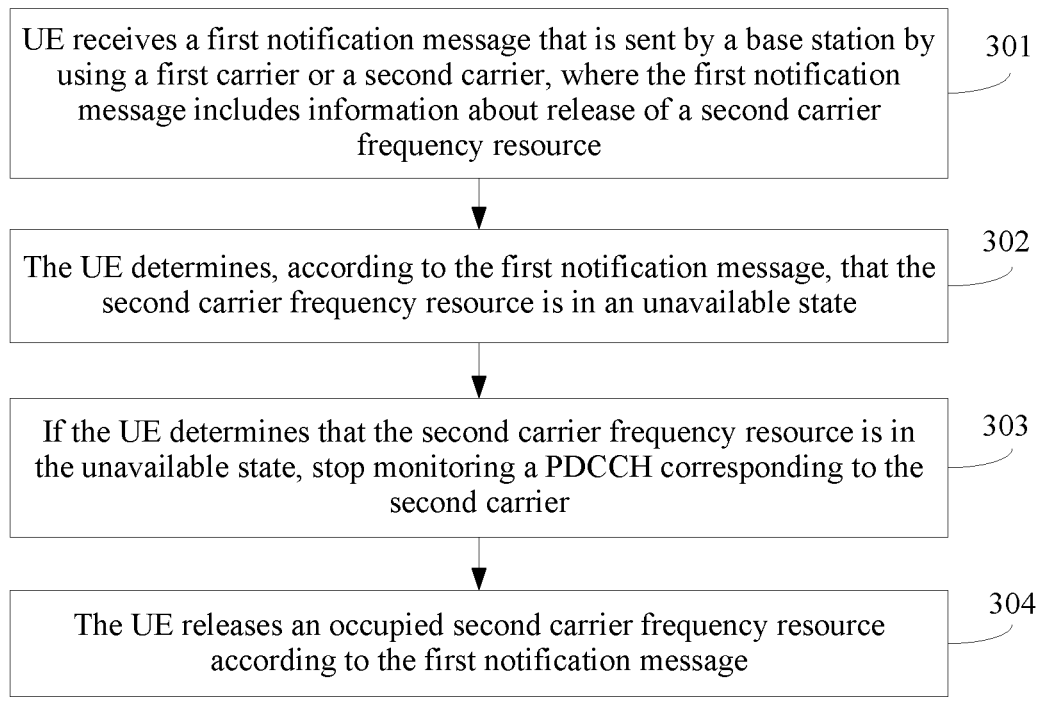
FIG. 3 is a schematic flowchart of a channel monitoring method according to a second embodiment of the present invention.

FIG. 3 is a schematic flowchart of a channel monitoring method according to a second embodiment of the present invention. As shown in FIG. 3, the channel monitoring method in this embodiment includes:

301. UE receives a first notification message that is sent by a base station by using a first carrier or a second carrier, where the first notification message includes information about release of a frequency resource of the second carrier.

302. The UE determines, according to the first notification message, that the frequency resource of the second carrier is in an unavailable state.

303. If the UE determines that the frequency resource of the second carrier is in the unavailable state, stop monitoring a PDCCH corresponding to the second carrier.

304. The UE releases an occupied frequency resource of the second carrier according to the first notification message.

According to the foregoing method, power consumption of UE is reduced, and the UE can properly use an unlicensed frequency to communicate with a base station. This embodiment is merely used as an example for description, and imposes no limitation on a sequence of the steps. In a specific application process, a sequence of some of the steps may be adjusted, or some of the steps may be performed in parallel.

Figure 4:
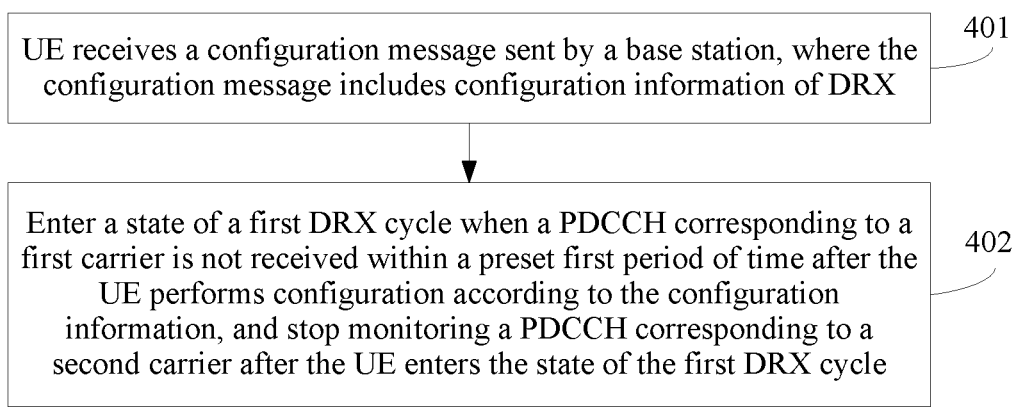
FIG. 4 is a schematic flowchart of a channel monitoring method according to a third embodiment of the present invention.

FIG. 4 is a schematic flowchart of a channel monitoring method according to a third embodiment of the present invention. As shown in FIG. 4, the channel monitoring method in this embodiment includes the following steps:

401. UE receives a configuration message sent by a base station, where the configuration message includes configuration information of DRX.

The configuration information of the DRX in this embodiment may be a length of a DRX cycle, duration of monitoring a PDCCH within the DRX cycle, or the like.

402. Enter a state of a first DRX cycle when a PDCCH corresponding to a first carrier is not received within a preset first period of time after the UE performs configuration according to the configuration information, and stop monitoring a PDCCH corresponding to a second carrier after the UE enters the state of the first DRX cycle.

In this embodiment, the first carrier is a carrier on which the UE operates on a continuously occupied frequency resource, and the second carrier is a carrier on which the UE operates on a discontinuously occupied frequency resource.

The state of the first DRX cycle herein may be understood as a DRX cycle state with a relatively short time in FIG. 1.

Optionally, the method shown in FIG. 4 may further include the following step 403 that is not shown in the figure:

403. After the UE exits the state of the first DRX cycle, start to monitor the PDCCH corresponding to the second carrier.

According to the foregoing method, UE can properly use an unlicensed frequency to communicate with a base station, and power consumption of the UE can be reduced.

Figure 5:
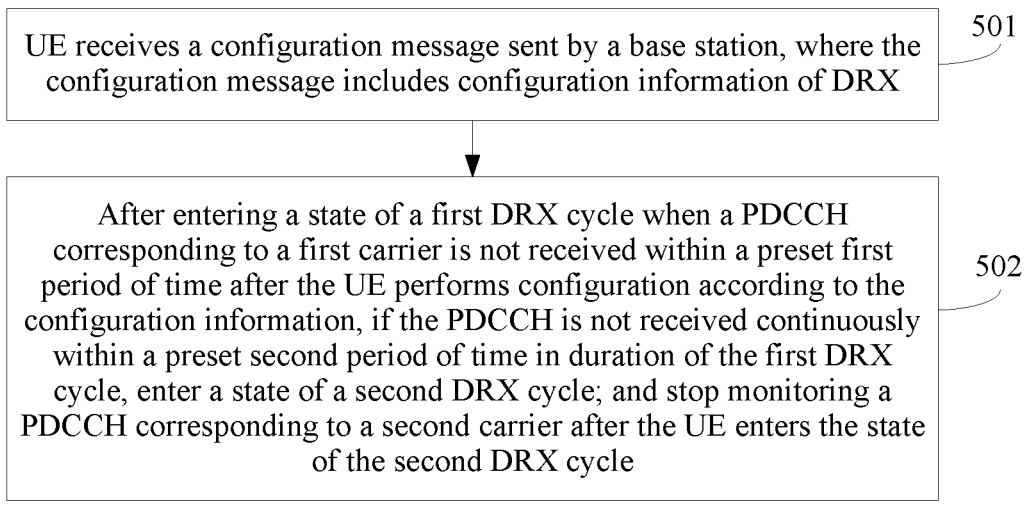
FIG. 5 is a schematic flowchart of a channel monitoring method according to a fourth embodiment of the present invention.

FIG. 5 is a schematic flowchart of a channel monitoring method according to a fourth embodiment of the present invention. As shown in FIG. 5, the channel monitoring method in this embodiment includes the following steps:

501. UE receives a configuration message sent by a base station, where the configuration message includes configuration information of DRX.

502. After entering a state of a first DRX cycle when a PDCCH corresponding to a first carrier is not received within a preset first period of time after the UE performs configuration according to the configuration information, if the PDCCH is not received continuously within a preset second period of time in duration of the first DRX cycle, enter a state of a second DRX cycle; and stop monitoring a PDCCH corresponding to a second carrier after the UE enters the state of the second DRX cycle.

The first carrier is a carrier on which the UE operates on a continuously occupied frequency resource, and the second carrier is a carrier on which the UE operates on a discontinuously occupied frequency resource.

The first DRX cycle and the second DRX cycle in this step may be preset, as shown in FIG. 1.

Optionally, the method shown in FIG. 5 may further include the following step 503 that is not shown in the figure:

After the UE exits the state of the second DRX cycle, start to monitor the PDCCH corresponding to the second carrier.

According to the foregoing method, UE can properly use an unlicensed frequency to communicate with a base station, and power consumption of the UE can be reduced.

Figure 6:
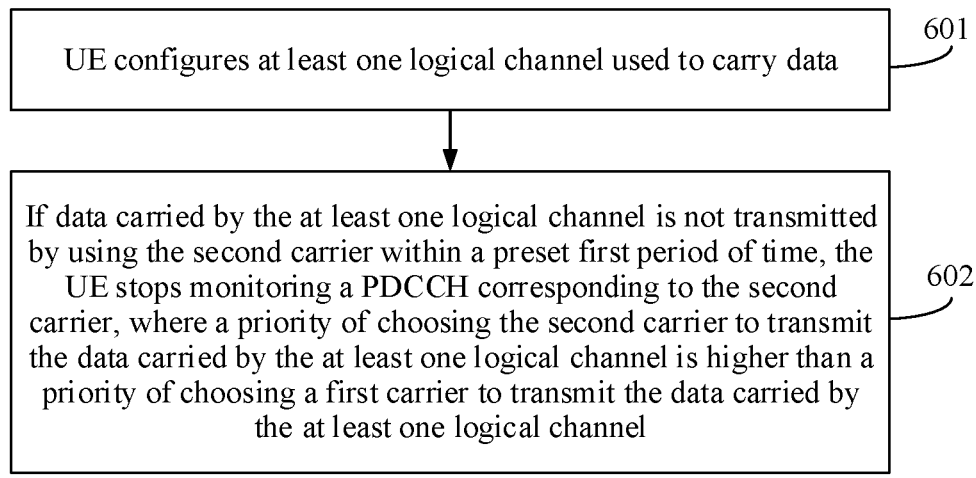
FIG. 6 is a schematic flowchart of a channel monitoring method according to a fifth embodiment of the present invention.

FIG. 6 is a schematic flowchart of a channel monitoring method according to a fifth embodiment of the present invention. As shown in FIG. 6, the channel monitoring method in this embodiment includes the following steps:

601. UE configures at least one logical channel used to carry data.

602. If the data carried by the at least one logical channel is not transmitted by using the second carrier within a preset first period time, the UE stops monitoring a PDCCH corresponding to the second carrier.

A priority of choosing the second carrier to transmit the data carried by the at least one logical channel is higher than a priority of choosing a first carrier to transmit the data carried by the at least one logical channel.

That is, the first carrier and the second carrier have different priorities of transmitting the data on the logical channel, that is, a priority of transmitting the data on the logical channel by using the second carrier is higher than a priority of transmitting the data on the logical channel by using the first carrier.

The foregoing first carrier may be a carrier on which the UE operates on a continuously occupied frequency resource, and the second carrier may be a carrier on which the UE operates on a discontinuously occupied frequency resource.

Optionally, the method shown in FIG. 6 may further include the following step 603 that is not shown in the figure:

603. When no data is transmitted on the second carrier within a preset second period of time, stop monitoring the PDCCH corresponding to the second carrier.

According to the foregoing method, UE can properly use an unlicensed frequency to communicate with a base station, and power consumption of the UE can be reduced.

Figure 7:
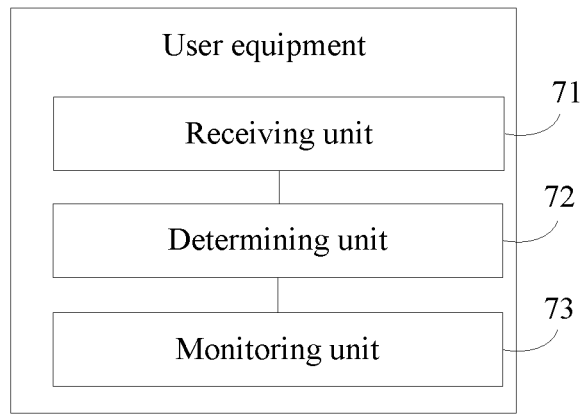
FIG. 7 is a schematic structural diagram of user equipment according to a sixth embodiment of the present invention.

FIG. 7 is a schematic structural diagram of user equipment according to a sixth embodiment of the present invention. As shown in FIG. 7, the user equipment in this embodiment includes: a receiving unit 71, a determining unit 72, and a monitoring unit 73.

The receiving unit 71 is configured to receive a first notification message sent by a base station, where the first notification message includes usage information of a frequency resource of a second carrier.

The determining unit 72 is configured to determine, according to the first notification message received by the receiving unit 71, whether the frequency resource of the second carrier is in an available state.

The monitoring unit 73 is configured to: when the determining unit 72 determines that the frequency resource of the second carrier is in the available state, monitor a physical downlink control channel PDCCH corresponding to the second carrier; or when the determining unit 72 determines that the frequency resource of the second carrier is in an unavailable state, stop monitoring a PDCCH corresponding to the second carrier.

The second carrier is a carrier on which the user equipment UE operates on a discontinuously occupied frequency resource.

Optionally, the receiving unit 71 is specifically configured to receive the first notification message that is sent by the base station by using the second carrier; or receive the first notification message that is sent by the base station by using a first carrier, where the first carrier is a carrier on which the UE operates on a continuously occupied frequency resource.

For example, the usage information of the frequency resource of the second carrier may include one or more of the following information: information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

Optionally, the information about the availability of the frequency resource of the second carrier may include scheduling indication information used by the base station to schedule the UE to perform data transmission on the second carrier.

In an optional implementation scenario, when the usage information of the frequency resource of the second carrier includes the information about the duration in which the frequency resource of the second carrier is unavailable, the determining unit 72 is specifically configured to: determine, according to the first notification message received by the receiving unit 71, that the frequency resource of the second carrier is in the unavailable state, determine the duration of the unavailable state of the frequency resource of the second carrier, and after the duration of the unavailable state ends, determine that the frequency resource of the second carrier is in the available state.

In a second optional implementation scenario, when the usage information of the frequency resource of the second carrier includes the information about the duration in which the frequency resource of the second carrier is available, the determining unit 72 is specifically configured to: determine, according to the first notification message received by the receiving unit 71, that the frequency resource of the second carrier is in the available state, determine the duration of the available state of the frequency resource of the second carrier, and after the duration of the available state ends, determine that the frequency resource of the second carrier is in the unavailable state.

In a third optional implementation scenario, when the usage information of the frequency resource of the second carrier includes the information about release of the frequency resource of the second carrier, the determining unit 72 is specifically configured to determine, according to the first notification message received by the receiving unit 71, that the frequency resource of the second carrier is in the unavailable state.

Correspondingly, the user equipment further includes a releasing unit 74 that is not shown in the figure, where the releasing unit 74 is configured to release an occupied frequency resource of the second carrier according to the first notification message received by the receiving unit 71.

According to the foregoing user equipment, power consumption can be reduced while an unlicensed frequency is used to perform communication.

Figure 8:
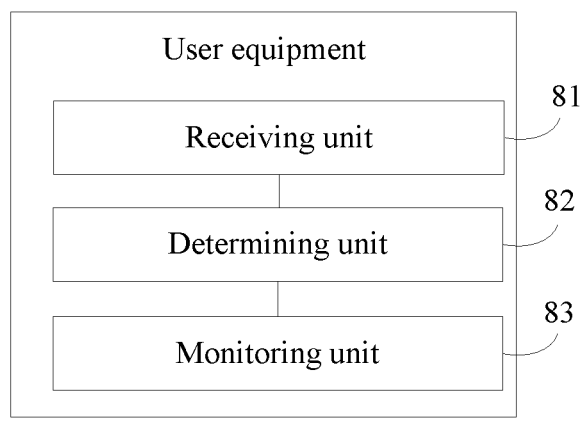
FIG. 8 is a schematic structural diagram of user equipment according to a seventh embodiment of the present invention.

FIG. 8 is a schematic structural diagram of user equipment according to a seventh embodiment of the present invention. As shown in FIG. 8, the user equipment in this embodiment includes: a receiving unit 81, a configuration unit 82, and a monitoring unit 83.

The receiving unit 81 is configured to receive a configuration message sent by a base station, where the configuration message includes configuration information of DRX.

The configuration unit 82 is configured to perform configuration according to the configuration information received by the receiving unit 81.

The monitoring unit 83 is configured to: enter a state of a first DRX cycle when a physical downlink control channel PDCCH corresponding to a first carrier is not received within a preset first period of time after the configuration unit 82 performs the configuration, and stop monitoring a PDCCH corresponding to a second carrier after the UE enters the state of the first DRX cycle.

The foregoing second carrier may be a carrier on which the UE operates on a discontinuously occupied frequency resource.

Optionally, the foregoing monitoring unit 83 is further configured to: after the UE exits the state of the first DRX cycle, start to monitor the PDCCH corresponding to the second carrier.

In an optional implementation scenario, the receiving unit 81 is configured to receive the configuration message sent by the base station, where the configuration message includes the configuration message of DRX.

The configuration unit 82 is configured to perform the configuration according to the configuration information received by the receiving unit 81.

The monitoring unit 83 is configured to: after entering the state of the first DRX cycle when the PDCCH corresponding to the first carrier is not received within the preset first period of time after the configuration unit 82 performs the configuration, if the PDCCH is not received continuously within a preset second period of time in duration of the first DRX cycle, enter a state of a second DRX cycle; and stop monitoring the PDCCH corresponding to the second carrier after the UE enters the state of the second DRX cycle.

Optionally, the foregoing monitoring unit 83 is further configured to: after the UE exits the second DRX cycle, start to monitor the PDCCH corresponding to the second carrier.

The foregoing first carrier may be a carrier on which the UE operates on a continuously occupied frequency resource, and the foregoing second carrier may be a carrier on which the UE operates on a discontinuously occupied frequency resource.

Figure 9:
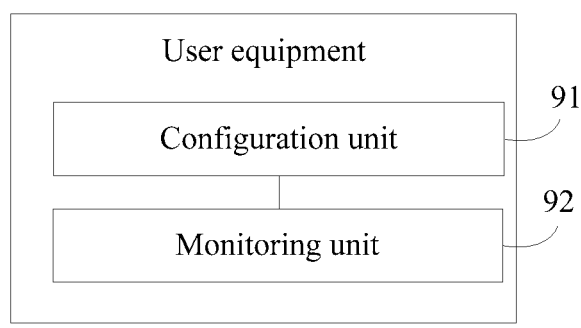
FIG. 9 is a schematic structural diagram of user equipment according to an eighth embodiment of the present invention.

FIG. 9 is a schematic structural diagram of user equipment according to an eighth embodiment of the present invention. As shown in FIG. 9, the user equipment in this embodiment includes: a configuration unit 91 and a monitoring unit 92.

The configuration unit 91 is configured to configure at least one logical channel used to carry data.

The monitoring unit 92 is configured to: when the data carried by the at least one logical channel is not transmitted by using the second carrier within a preset first period time, stop monitoring a physical downlink control channel PDCCH corresponding to the second carrier.

A priority of choosing the second carrier to transmit the data carried by the at least one logical channel is higher than a priority of choosing a first carrier to transmit the data carried by the at least one logical channel, and the second carrier is a carrier on which the UE operates on a discontinuously occupied frequency resource.

The first carrier may be a carrier on which the UE operates on a continuously occupied frequency resource, and the second carrier may be a carrier on which the UE operates on a discontinuously occupied frequency resource.

Optionally, the monitoring unit 92 is further configured to: when no data is transmitted on the second carrier within a preset second period of time, stop monitoring the PDCCH corresponding to the second carrier.

The preset first period of time and the preset second period of time in this embodiment may be different from the first period of time and the second period of time described in FIG. 8.

Figure 10:
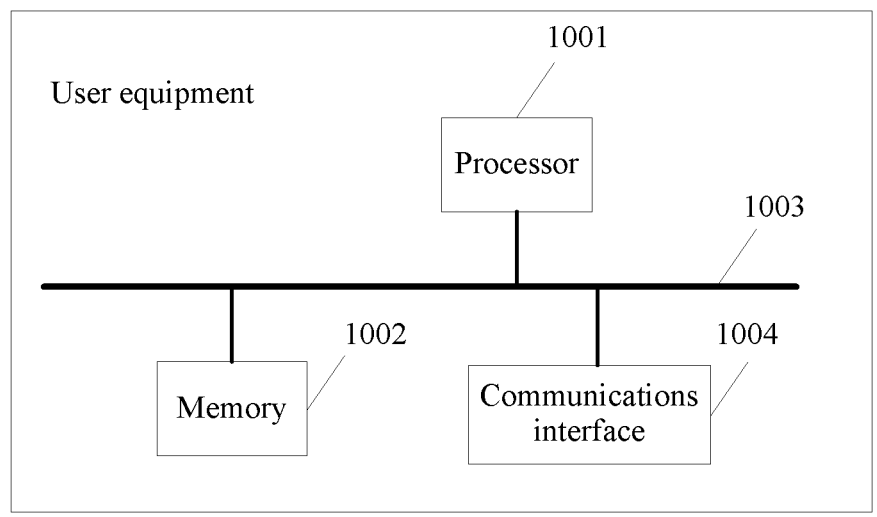
FIG. 10 is a schematic structural diagram of user equipment according to a ninth embodiment of the present invention.

FIG. 10 is a schematic structural diagram of user equipment according to a ninth embodiment of the present invention. As shown in FIG. 10, the user equipment in this embodiment includes: a processor 1001, a memory 1002, a bus 1003, and a communications interface 1004, where the processor 1001 may be connected to the memory 1002 by using the bus 1003. The memory 1002 is configured to store an instruction, and the processor 1001 executes the instruction stored in the memory 1002, so as to perform the following processing:

receiving a first notification message sent by a base station, where the first notification message includes usage information of a frequency resource of a second carrier;

determining, according to the first notification message, whether the frequency resource of the second carrier is in an available state; and if it is determined that the frequency resource of the second carrier is in an available state, monitoring a physical downlink control channel PDCCH of the second carrier; otherwise, stopping monitoring a PDCCH of the second carrier.

Optionally, the processor 1001 is specifically configured to: receive the first notification message that is sent by the base station by using the second carrier; or receive the first notification message that is sent by the base station by using a first carrier.

The first carrier is a carrier on which the UE operates on a continuously occupied frequency resource, and the second carrier is a carrier on which the UE operates on a discontinuously occupied frequency resource.

Optionally, the usage information of the frequency resource of the second carrier includes one or more of the following information: information about availability of the frequency resource of the second carrier;

information about unavailability of the frequency resource of the second carrier;

information about duration in which the frequency resource of the second carrier is unavailable;

information about duration in which the frequency resource of the second carrier is available; and information about release of the frequency resource of the second carrier.

For example, the information about the availability of the frequency resource of the second carrier may include scheduling indication information used by the base station to schedule the UE to perform data transmission on the second carrier.

In an optional implementation scenario, when the usage information of the frequency resource of the second carrier includes the information about the duration in which the frequency resource of the second carrier is unavailable, the processor 1001 may be specifically configured to: determine, according to the first notification message, that the frequency resource of the second carrier is in the unavailable state, determine the duration of the unavailable state of the frequency resource of the second carrier, and after the duration of the unavailable state ends, determine that the frequency resource of the second carrier is in the available state.

In a second optional implementation scenario, when the usage information of the frequency resource of the second carrier includes the information about the duration in which the frequency resource of the second carrier is available, the processor 1001 is specifically configured to: determine, according to the first notification message, that the frequency resource of the second carrier is in the available state, determine the duration of the available state of the frequency resource of the second carrier, and after the duration of the available state ends, determine that the frequency resource of the second carrier is in the unavailable state.

In a third optional implementation scenario, when the usage information of the frequency resource of the second carrier includes the information about release of the frequency resource of the second carrier, the processor 1001 is specifically configured to determine, according to the first notification message, that the frequency resource of the second carrier is in the unavailable state; and release an occupied frequency resource of the second carrier according to the first notification message.

In a fourth optional implementation scenario, the processor 1001 is specifically configured to: receive a configuration message sent by the base station, where the configuration message includes configuration information of DRX;

enter a state of a first DRX cycle when a physical downlink control channel PDCCH corresponding to a first carrier is not received within a preset first period of time after performing configuration according to the configuration information, and stop monitoring the PDCCH corresponding to the second carrier after the UE enters the state of the first DRX cycle, where the second carrier is a carrier on which the user equipment UE operates on a discontinuously occupied frequency resource, and the first carrier is a carrier on which the UE operates on a continuously occupied frequency resource.

Optionally, the processor 1001 is further configured to: after the UE exits the state of the first DRX cycle, start to monitor the PDCCH corresponding to the second carrier.

In a fifth optional implementation scenario, the processor 1001 is specifically configured to: receive a configuration message sent by the base station, where the configuration message includes configuration information of DRX;

after entering a state of a first DRX cycle when a PDCCH corresponding to the first carrier is not received within a preset first period of time after performing configuration according to the configuration information, if the PDCCH is not received continuously within a preset second period of time in duration of the first DRX cycle, enter a state of a second DRX cycle; and stop monitoring the PDCCH corresponding to the second carrier after the UE enters the state of the second DRX cycle.

Optionally, the processor 1001 is further configured to: after the UE exits the state of the second DRX cycle, start to monitor the PDCCH corresponding to the second carrier.

In a sixth optional implementation scenario, the processor 1001 is specifically configured to configure at least one logical channel used to carry data. If the data carried by the at least one logical channel is not transmitted by using the second carrier within a preset first period time, stop monitoring the physical downlink control channel PDCCH corresponding to the second carrier, where a priority of choosing the second carrier to transmit the data carried by the at least one logical channel is higher than a priority of choosing a first carrier to transmit the data carried by the at least one logical channel, and the second carrier is a carrier on which the user equipment UE operates on a discontinuously occupied frequency resource.

The first carrier is a carrier on which the UE operates on a continuously occupied frequency resource, and the second carrier is a carrier on which the UE operates on a discontinuously occupied frequency resource.

Optionally, the processor 1001 is further configured to: when no data is transmitted on the second carrier within a preset second period of time, stop monitoring the PDCCH corresponding to the second carrier.

The foregoing processor 1001 may execute any step in the foregoing methods, and this embodiment is merely used as an example for description.

According to the foregoing user equipment, power consumption can be reduced while an unlicensed frequency is used to perform communication.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel monitoring method in a network having: a first carrier and a second carrier, and a licensed spectrum and an unlicensed spectrum, the method comprising:

receiving, by a user equipment (UE), a first notification message that is sent by a base station using the second carrier, wherein the first notification message comprises usage information of a frequency resource of the second carrier, wherein the usage information of the frequency resource of the second carrier comprises:

first duration information about a duration in which the frequency resource of the second carrier is unavailable, or second duration information about a duration in which the frequency resource of the second carrier is available;

determining, by the UE according to the first duration information or the second duration information in the first notification message, whether the frequency resource of the second carrier is in an available state or in an unavailable state;
configuring, by the UE, at least one logical channel used to carry data;
when the UE determines that the frequency resource of the second carrier is in the available state, monitoring a physical downlink control channel (PDCCH) corresponding to the second carrier; and
when the UE determines that the frequency resource of the second carrier is in an unavailable state and when the data carried by the at least one logical channel is not transmitted using the second carrier within a preset first period of time, stopping actively monitoring a PDCCH corresponding to the second carrier, wherein
the second carrier is a carrier on which the UE operates on a discontinuously occupied frequency resource of the unlicensed spectrum, and the first carrier is a carrier on which the UE operates on a continuously occupied frequency resource of the licensed spectrum, and
a priority of choosing the second carrier to transmit the data carried by the at least one logical channel is higher than a priority of choosing the first carrier to transmit the data carried by the at least one logical channel.

2. The method according to claim 1, wherein the usage information of the frequency resource of the second carrier further comprises one or more of the following information:
   information about availability of the frequency resource of the second carrier;
   information about unavailability of the frequency resource of the second carrier; or
   information about release of the frequency resource of the second carrier.

3. The method according to claim 1, wherein the usage information of the frequency resource of the second carrier comprises the first duration information about the duration in which the frequency resource of the second carrier is unavailable; and
   the determining, according to the first notification message, whether the frequency resource of the second carrier is in an available state comprises:
   determining, according to the first notification message, that the frequency resource of the second carrier is in the unavailable state, determining the duration of the unavailable state of the frequency resource of the second carrier, and after the duration of the unavailable state ends, determining that the frequency resource of the second carrier is in the available state.

4. The method according to claim 1, wherein the usage information of the frequency resource of the second carrier comprises the second duration information about the duration in which the frequency resource of the second carrier is available; and
   the determining, according to the first notification message, whether the frequency resource of the second carrier is in an available state comprises:
   determining, according to the first notification message, that the frequency resource of the second carrier is in the available state, determining the duration of the available state of the frequency resource of the second carrier, and after the duration of the available state ends, determining that the frequency resource of the second carrier is in the unavailable state.

5. An apparatus in a network having: a first carrier and a second carrier, and a licensed spectrum and an unlicensed spectrum, the apparatus comprising:
   a non-transitory memory and a processor, wherein the non-transitory memory is configured to store an instruction and the processor is configured to execute the instruction stored in the non-transitory memory so as to:
   receive a first notification message that is sent by a base station using the second carrier, wherein the first notification message comprises usage information of a frequency resource of the second carrier, wherein the usage information of the frequency resource of the second carrier comprises:
   first duration information about a duration in which the frequency resource of the second carrier is unavailable, or
   second duration information about a duration in which the frequency resource of the second carrier is available;
   determine, according to the first duration information or the second duration information in the first notification message, whether the frequency resource of the second carrier is in an available state or in an unavailable state;
   configure at least one logical channel used to carry data;
   when it is determined that the frequency resource of the second carrier is in the available state, monitor a physical downlink control channel (PDCCH) corresponding to the second carrier; and
   when it is determined that the frequency resource of the second carrier is in an unavailable state and when the data carried by the at least one logical channel is not transmitted using the second carrier within a preset first period of time, stop actively monitoring a PDCCH corresponding to the second carrier, wherein
   the second carrier is a carrier on which user equipment (UE) operates on a discontinuously occupied frequency resource of the unlicensed spectrum, and the first carrier is a carrier on which the UE operates on a continuously occupied frequency resource of the licensed spectrum, and
   a priority of choosing the second carrier to transmit the data carried by the at least one logical channel is higher than a priority of choosing the first carrier to transmit the data carried by the at least one logical channel.

6. The apparatus according to claim 5, wherein the usage information of the frequency resource of the second carrier further comprises one or more of the following information:
   information about availability of the frequency resource of the second carrier;
   information about unavailability of the frequency resource of the second carrier; and
   information about release of the frequency resource of the second carrier.

7. The apparatus according to claim 6, wherein the information about the availability of the frequency resource of the second carrier comprises:
   scheduling indication information used by the base station to schedule the UE to perform data transmission on the second carrier.

8. The apparatus according to claim 6, wherein when the usage information of the frequency resource of the second carrier comprises the information about release of the frequency resource of the second carrier, the processor is further configured to:
   determine, according to the first notification message, that the frequency resource of the second carrier is in the unavailable state; and
   the processor is further configured to:
   release an occupied frequency resource of the second carrier according to the first notification message.

9. The apparatus according to claim 5, wherein when the usage information of the frequency resource of the second carrier comprises the first duration information about the duration in which the frequency resource of the second carrier is unavailable, the processor is further configured to:
determine, according to the first notification message, that the frequency resource of the second carrier is in the unavailable state, determine the duration of the unavailable state of the frequency resource of the second carrier, and after the duration of the unavailable state ends, determine that the frequency resource of the second carrier is in the available state.

10. The apparatus according to claim 5, wherein when the usage information of the frequency resource of the second carrier comprises the second duration information about the duration in which the frequency resource of the second carrier is available, the processor is further configured to:
determine, according to the first notification message, that the frequency resource of the second carrier is in the available state, determine the duration of the available state of the frequency resource of the second carrier, and after the duration of the available state ends, determine that the frequency resource of the second carrier is in the unavailable state.

11. The apparatus according to claim 5, wherein the processor is further configured to:
when no data is transmitted on the second carrier within a preset second period of time, stop monitoring the PDCCH corresponding to the second carrier.

12. A channel monitoring method in a network having: a first carrier and a second carrier, and a licensed spectrum and an unlicensed spectrum, the method comprising:
receiving, by a user equipment (UE), a first notification message that is sent by a base station using the first carrier, wherein the first notification message comprises usage information of a frequency resource of the second carrier, wherein the usage information of the frequency resource of the second carrier comprises:
first duration information about a duration in which the frequency resource of the second carrier is unavailable, or
second duration information about a duration in which the frequency resource of the second carrier is available;
determining, by the UE according to the first duration information or the second duration information in the first notification message, whether the frequency resource of the second carrier is in an available state or in an unavailable state;
configuring, by the UE, at least one logical channel used to carry data;
when the UE determines that the frequency resource of the second carrier is in the available state, monitoring a physical downlink control channel (PDCCH) corresponding to the second carrier; and
when the UE determines that the frequency resource of the second carrier is in an unavailable state and when the data carried by the at least one logical channel is not transmitted using the second carried within a preset first period of time, stopping actively monitoring a PDCCH corresponding to the second carrier, wherein
the first carrier is a carrier on which the UE operates on a continuously occupied frequency resource of the licensed spectrum, and the second carrier is a carrier on which the UE operates on a discontinuously occupied frequency resource of the unlicensed spectrum, and
a priority of choosing the second carrier to transmit the data carried by the at least one logical channel is higher than a priority of choosing the first carrier to transmit the data carried by the at least one logical channel.

13. The method according to claim 12, wherein the usage information of the frequency resource of the second carrier further comprises one or more of the following information:
information about availability of the frequency resource of the second carrier;
information about unavailability of the frequency resource of the second carrier; or
information about release of the frequency resource of the second carrier.

14. An apparatus in a network having: a first carrier and a second carrier, and a licensed spectrum and an unlicensed spectrum, the apparatus comprising:
a non-transitory memory and a processor, wherein the non-transitory memory is configured to store an instruction and the processor is configured to execute the instruction stored in the non-transitory memory so as to:
receive a first notification message that is sent by a base station using the first carrier, wherein the first notification message comprises usage information of a frequency resource of the second carrier, wherein the usage information of the frequency resource of the second carrier comprises:
first duration information about a duration in which the frequency resource of the second carrier is unavailable, or
second duration information about a duration in which the frequency resource of the second carrier is available;
determine, according to the first duration information or the second duration information in the first notification message, whether the frequency resource of the second carrier is in an available state or in an unavailable state;
configure at least one logical channel used to carry data;
when it is determined that the frequency resource of the second carrier is in the available state, monitor a physical downlink control channel (PDCCH) corresponding to the second carrier; and
when it is determined that the frequency resource of the second carrier is in an unavailable state and when the data carried by the at least one logical channel is not transmitted using the second carrier within a preset first period of time, stop actively monitoring a PDCCH corresponding to the second carrier, wherein
the first carrier is a carrier on which user equipment (UE) operates on a continuously occupied frequency resource of the licensed spectrum, and the second carrier is a carrier on which the UE operates on a discontinuously occupied frequency resource of the unlicensed spectrum, and
a priority of choosing the second carrier to transmit the data carried by the at least one logical channel is higher than a priority of choosing the first carrier to transmit the data carried by the at least one logical channel.

15. The apparatus according to claim 14, wherein the usage information of the frequency resource of the second carrier further comprises one or more of the following information:
information about availability of the frequency resource of the second carrier;
information about unavailability of the frequency resource of the second carrier; or information about release of the frequency resource of the second carrier.

\* \* \* \* \*